United States Patent [19]
von Allwoerden et al.

[11] Patent Number: 4,800,710
[45] Date of Patent: Jan. 31, 1989

[54] ROTARY MOWER

[75] Inventors: Wilhelm von Allwoerden, Gailingen; Martin Maier, Gottmadingen, both of Fed. Rep. of Germany

[73] Assignee: Kloeckner-Humboldt-Deutz AG, Fed. Rep. of Germany

[21] Appl. No.: 132,172

[22] Filed: Dec. 14, 1987

[30] Foreign Application Priority Data

Dec. 23, 1986 [DE] Fed. Rep. of Germany ....... 3644273

[51] Int. Cl.$^4$ ............................................. A01D 34/74
[52] U.S. Cl. ....................................... 56/17.2; 56/13.6
[58] Field of Search .................... 56/13.6, 6, 17.1, 17.2

[56] References Cited

U.S. PATENT DOCUMENTS

| | | | |
|---|---|---|---|
| 3,141,283 | 7/1964 | Swindler | 56/17.2 |
| 4,084,395 | 4/1978 | Nannen | 56/17.2 |
| 4,233,805 | 11/1980 | Vander Lely | 56/17.2 |
| 4,286,423 | 9/1981 | Caldwell | 56/13.6 |
| 4,426,828 | 1/1984 | Nevrburg | 56/13.6 |
| 4,706,848 | 11/1987 | Nannen | 56/17.2 |

FOREIGN PATENT DOCUMENTS

| | | | |
|---|---|---|---|
| 2531420 | 2/1977 | Fed. Rep. of Germany | 56/13.6 |
| 3113726 | 10/1982 | Fed. Rep. of Germany | 56/13.6 |
| 7805129 | 11/1979 | Netherlands | 56/13.6 |
| 2068206 | 8/1981 | United Kingdom | 56/13.6 |
| 2098045 | 11/1982 | United Kingdom | 56/13.6 |
| 2166032 | 4/1986 | United Kingdom | 56/13.6 |

Primary Examiner—Paul J. Hirsch
Attorney, Agent, or Firm—Charles L. Schwab

[57] ABSTRACT

A rotary mower with at least one rotary cutter unit rotated on a vertical axis by means of a drive shaft which has a first bearing hub secured to its lower end. A cutter disc is secured to the first bearing hub and a second bearing hub is coaxially and rotatably mounted on the first bearing hub. A rigid intermediate disc is secured to the second bearing hub so as to be disposed beneath the cutter disc. A skid disc on a third bearing hub is disposed coaxially beneath the intermediate disc in such a way that its central portion can be axially adjusted by means of an adjustment device to change the height of cut. The skid disc is elastically flexible with its outer rim engaging the outer rim of the intermediate disc in all positions of height adjustment.

13 Claims, 3 Drawing Sheets

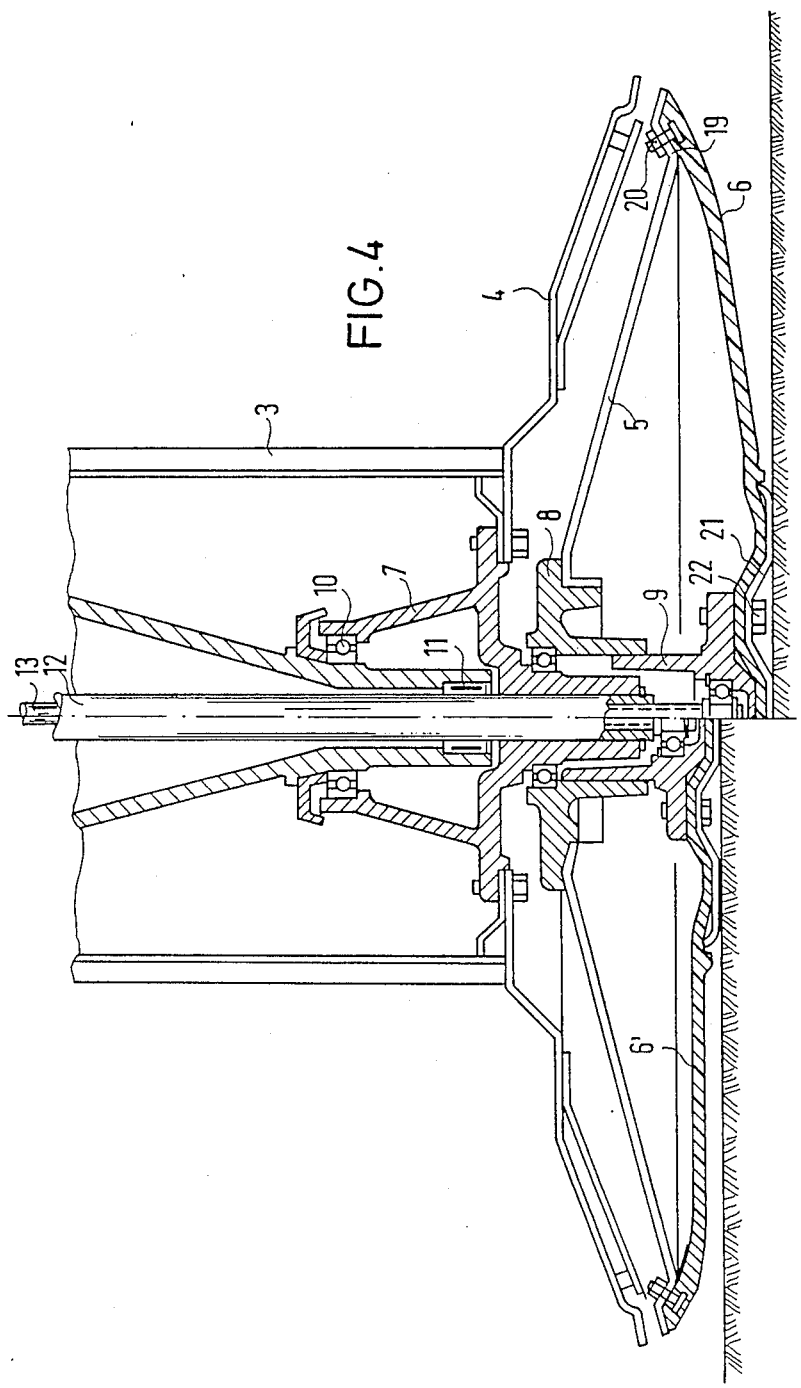

ROTARY MOWER

TECHNICAL FIELD

This invention relates to a rotary mower with at least one rotary cutter unit having a vertical drive shaft with a cutter disc coaxially secured to its lower end and particularly to such a rotary mower having a skid disc below the cutting disc together with an adjusting device for axially shifting the skid disc relative to the cutter disc so as to change the height of cut.

PRIOR ART STATEMENT

West German Pat. No. DE-OS 33 16 204 shows and describes a device for adjusting the height of cut for a tractor-pulled rotary mower which is equipped with cutting discs. An axially adjustable skid disc has an outer hub welded thereto and is disposed beneath the cutting drum. An inner hub is supported on the lower end of the vertical drive shaft and is in telescopic relation with the outer hub. The outer hub can be vertically displaced together with the skid disc by an adjusting screw having threaded engagement with a radial flange on the outer hub.

In another prior art, a rotary mower of the type having a cutter disc driven by a vertical shaft, the lower end of the vertical shaft has a skid disc connected thereto and the skid disc is adjusted relative to the cutting disc by axial shifting movement of the drive shaft.

In these prior art adjustable-height rotary mowers, the ground engaging skid disc is adjusted relative to the cutting disc so as to change the distance between the cutting disc and the ground. In doing so, the axial distance between the skid disc and the cutter disc is changed as the cutting height is changed. For instance, the axial clearance space between the cutter disc and the skid disc is increased when the height of cut is increased, thereby increasing the likelihood that a blockage will occur because of cut crop material entering the axial clearance space. Also, if crop material enters the axial clearance space, the rotary cutter unit may become unbalanced, thereby subjecting the bearings to greater stress and wear. In addition, the mounting structures for the individual cutting knives may be damaged by the penetration of stones into the axial clearance space.

OBJECTS AND BRIEF SUMMARY OF THE INVENTION

It is a principal object of the invention to provide a rotary mower which is not subject to blockage by crop material entering the space between the cutter disc and the skid disc.

In order to meet this objective, an elastically flexible skid disc is provided with its outer rim supported on the outer rim of an intermediate disc, which is made of a rigid material and mounted so that it cannot be axially shifted relative to the cutter disc. The skid disc may advantageously be made of a fiber-reinforced plastic with a rigid reinforcing disc of smaller diameter and of a wear-resistant material, such as steel, secured thereat beneath to engage the ground during a mowing operation. The outer rim of the plastic skid disc is connected to the outer rim of a rigid intermediate disc which is not axially shiftable relative to the cutter disc.

The outer rim of the skid disc can resiliently engage the intermediate disc or it can be securely connected to it along its entire circumference or it can be releasably connected with it along its circumference by means of a plurality of bolts arranged at spaced intervals to one another.

Preferably, the skid disc is not dished as much as the intermediate disc.

In a preferred embodiment of the invention, the axially displaceable bearing hub of the skid disc extends into a cavity between a first bearing hub of the cutter disc and a second bearing hub for the intermediate disc.

In another advantageous embodiment of the invention, the axially displaceable bearing hub of the skid disc coaxially surrounds the second bearing hub of the intermediate disc.

The adjustment device for the axially shiftable bearing hub of the skid disc preferably includes an adjustment spindle, which either extends axially through a hollow drive shaft to connect to the axially shiftable bearing hub with its upper end extending above the drive shaft, or is coaxially mounted on the axially adjustable bearing hub underneath a solid drive shaft and is in threaded engagement with an internal thread in the second bearing hub of the intermediate disc.

An important advantage is achieved in the present invention by keeping the annular clearance between the cutter disc and the skid disc constant. This greatly reduces entrance of dirt between the two discs and imbalances of the rotary cutter units are avoided, thus increasing the useful life of the bearings mounting such units.

BRIEF DESCRIPTION OF THE DRAWINGS

Several embodiments of the invention are hereinafter described in greater detail with reference to the drawings, in which:

FIG. 4 is a vertical section showing a third embodiment of the invention.

DETAILED DESCRIPTION OF THE DRAWINGS

Figure 1:
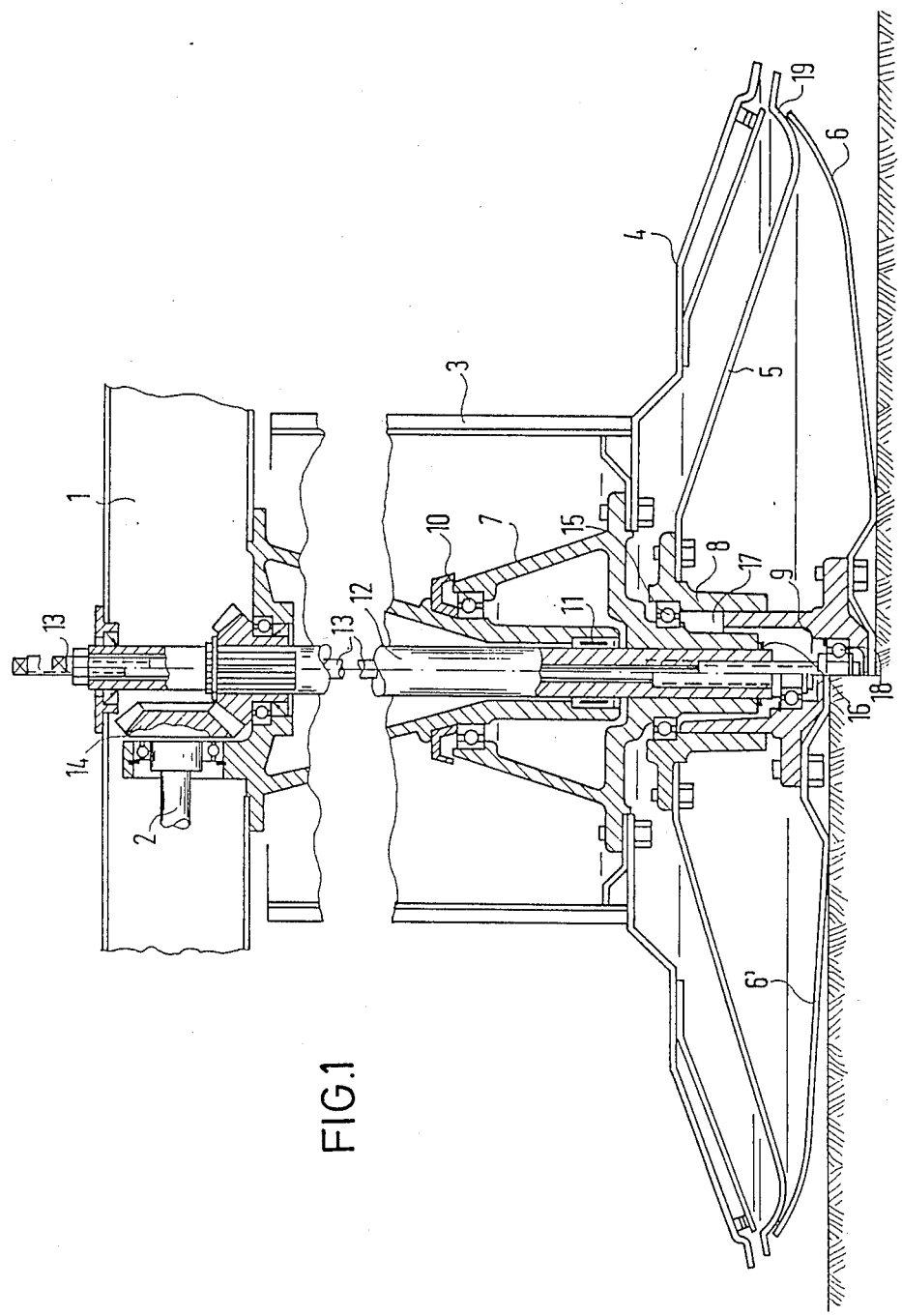
FIG. 1 is a vertical section through a rotary cutter unit incorporating one embodiment of the invention and illustrating two different heights of cut.

Referring to the drawings, the frame of the rotary mower includes a cross bar 1 which rotatably supports one or more rotary cutter units 3, each of which is connected for rotation with a generally vertical drive shaft 12, which in turn is connected to a horizontally disposed power shaft 2 by means of a suitable bevel gear set 14. A dished cutter disc 4 is positioned at the lower end of the rotary cutter unit 3 and is nonrotatably secured to a first bearing hub 7 which is rotatably supported by a needle bearing 11 and a ball bearing 10 on a conically shaped support on the frame of the rotary mower.

The lower end of the first bearing hub 7 is concentrically surrounded by and rotatably supports a second bearing hub 8 to which a dished intermediate disc 5 is secured for rotation therewith. The outer rim of the intermediate disc 5 is substantially parallel to and spaced below the outer rim of the cutter disc 4 so that a vertical clearance is formed between the rims for receiving a plurality of circumferentially spaced cutting blades, not shown, secured to the cutter disc 4.

A skid disc 6 is positioned beneath the intermediate disc 5 and is rigidly secured to a third bearing hub 9 by, for instance, cap screws. The bearing hub 9 is axially adjustable and includes a hollow cylindrical portion extending upwardly in telescopic relation with the second bearing hub 8. In the embodiment shown in FIG. 1, a suitable recess or cavity is provided between cylindrical portions of the first bearing hub 7 and the second bearing hub 8 for receiving the cylindrical portion of the third bearing hub 9. As illustrated in FIG. 1, the height of cut, i.e., the distance between the rim of the cutter disc 4 and the ground, is greater in the right half of FIG. 1 than in the left half in which the upper edge of the third bearing hub 9 is adjacent to a bearing 15 between the first and second bearing hubs. The bearing hub 9 is supported on an adjustment spindle 13 by a ball bearing 18. A snap ring 16 on the drive shaft 12 prevents upward axial movement thereof relative to the first bearing hub 7.

The intermediate disc 5 is made of a material which is very rigid and has a deep, pronounced convexity whereas the skid disc 6, which is made of a resiliently flexible material, has a shallow convexity. In other words, the disc 5 is more deeply dished than the disc 6. The outer rim of the skid disc 6 resiliently engages the adjacent outer rim of the rigid intermediate plate 5 at 19 and this engaging relationship exists at every height of cut to which the rotary mower is set. The outer rim of the skid disc 6 maintains its engagement with the intermediate disc 5, as shown in FIG. 1, because of the resilient flexing of the slightly dished skid disc 6.

As shown in FIG. 1, the axial shifting of the bearing hub 9, i.e., the adjustment of the height of cut, is carried out by an adjustment spindle 13 which extends axially through the hollow drive shaft 12. At its lower end the adjustment spindle 13 is connected to the axially shiftable bearing hub 9 by the ball bearing 18 while its upper end extends upwardly beyond the hollow shaft 12 and above the supporting cross bar or girder 1 and presents external threads on which an adjusting nut is threaded, thereby making it easy to adjust the adjustment spindle 13 from above. The central part of the flexible skid disc 6' can be contracted upwardly to effect a low height of cut, as is shown on the left in FIG. 1, or, as is shown on the right in FIG. 1, it can be extended downwardly to set a greater height of cut. Because of the flexibility of the skid disc 6, its outer rim remains in contact near 19 on the outer rim of the intermediate disc 5 thereby effectively sealing the cavity between the discs 5 and 6 against entrance of foreign material.

Figure 2:
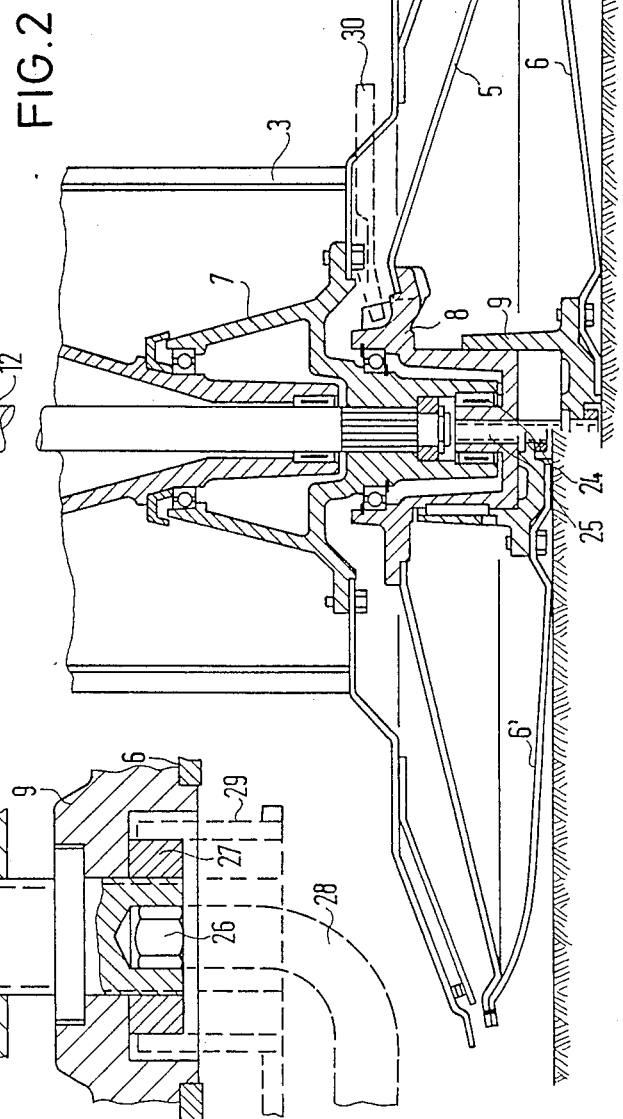
FIG. 2 is a vertical section through a rotary cutter unit showing variations of the invention and illustrating two different heights of cut.

In the embodiment represented in FIG. 2, similar components are provided with the same reference numbers. The outer circumference of the skid disc 6 is securely connected at 19 to the outer circumference of the intermediate disc 5 by welding, for example, which is illustrated by a welded connection 23. In FIG. 2 the adjustment of the height of cut is carried out by an externally threaded adjustment spindle 25 disposed coaxially beneath a solid drive shaft 12. The adjustment spindle 25 threadedly engages an internal thread in the second bearing hub 8 so that as the adjustment spindle is turned relative to the second bearing hub 8 the height of cut is changed; for instance, the disc 6 is flattened from its condition shown in the right half of FIG. 2 to its position shown in the left half of FIG. 2. As shown in FIG. 2, the axially shiftable bearing hub 9 coaxially surrounds the second bearing hub 8 in a telescopic sliding bearing relationship and a needle bearing 24 rotatably mounts the second bearing hub 8 on the lower end of the first bearing hub 7.

As shown on the left side of FIG. 2, a keyway and key connection is provided between bearing hubs 7 and 8 in order to permit telescopic axial movement but prevent relative rotation. In the left half of FIG. 2 a skid disc 6' is shown flattened by raising the bearing hub 9 relative to the hub 8, thus providing the lowest mower setting for cutting the crop. In the right half of FIG. 1 a skid disc 6 has flexed to a deeper dish shape in which the mower is adjusted to its highest setting for cutting the crop. As shown in the right half of FIG. 2, the hub 8 can be prevented from rotating during the turning of the adjusting spindle 25 by inserting an elongated tool, shown by broken lines 30, through an opening in the cutting disc 4 so as to engage a radial projection on the bearing hub 8.

Figure 3:
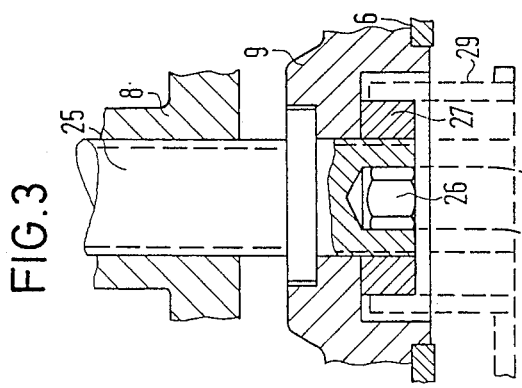
FIG. 3 is an enlarged section through the adjustment device of FIG. 2.

FIG. 3 is an enlarged showing of the lower end of the adjustment spindle 25, which threads axially into the internally threaded bearing hub 8. At the lower end of the adjustment spindle 25 an internal hexagon socket 26 is provided which is engageable by a hexagonal-ended tool or Allen wrench shown in broken lines 28 which can be inserted through an appropriate central opening in the skid disc 6. In addition, a lock nut 27 is provided on the lower end of the adjustment spindle 25 which can be rotated by a wrench shown by broken lines 29.

In the embodiment of FIG. 4, the rigid intermediate disc 5 of the rotary mower unit 3 is secured to a bearing hub 8 and the skid disc 6 is secured to a bearing hub 9 which includes a cylindrical portion having an axially sliding or telescoping fit with the hub 8. The cylindrical portion of the bearing hub 9 extends upwardly into a recess or cavity created by the radial clearance between cylindrical portions of the bearing hubs 7 and 8. The skid disc 6 in this embodiment is made of a fiber-reinforced plastic and the outer rim of the skid disc 6 is held in engagement at 19 with the intermediate disc 5 by bolts 20 which are mounted at circumferentially spaced intervals on the rim of the skid disc 6. The bolts 20 may be welded to a steel ring molded into the rim of the plastic skid disc 6.

In the ground contact area of the plastic skid disc 6 a stamped steel disc 21 is secured beneath the skid disc 6 by cap screws 22 threaded into drilled and tapped openings, not shown, in the disc 21 and the radial flange at the lower end of the bearing hub 9. The central ground engaging portion of the skid disc 6 is axially adjusted relative to the bearing hub 8 by an adjustment spindle 13 which extends axially through the hollow drive shaft 12 and is connected to the axially adjustable bearing hub 9 by an antifriction ball bearing.

The embodiments of the invention in which an exclusive property or privilege is claimed are defined as follows:

1. A rotary mower having a frame, at least one rotary cutter unit (3) including a first bearing hub (7) mounted on said frame for rotation about a generally vertical axis, drive means rotating said rotary cutter unit including a drive shaft (12) connected to said first bearing hub (7), a cutter disc (4) secured coaxially to said first bearing hub, an axially displaceable bearing hub (9) beneath said cutter disc (4), a skid disc (6) of flexible material having its central portion secured to said axially shiftable bearing hub (9), an intermediate disc (5) of rigid material rotatably mounted on said rotary cutter unit beneath said cutter disc (4), said intermediate disc (5) being axially nonshiftable relative to said cutter disc (4), the outer rim of said skid disc (6) supportingly engaging the outer rim of said intermediate disc (5) and an adjustment device connected to said axially shiftable bearing hub operable to shift the latter axially relative to said intermediate disc.

2. The rotary mower of claim 1 wherein said skid disc (6) is made of resilient material and its outer rim resiliently engages said rim of said intermediate disc (5).

3. The rotary mower of claim 2 wherein said rim of said skid disc is securely fastened to said rim of said intermediate disc about its entire circumference.

4. The rotary mower of claim 1 wherein said rim of said skid disc is releasably secured to said rim of said intermediate disc by a plurality of circumferentially spaced releasable fasteners.

5. The rotary mower of claim 1 wherein said discs are dished and said skid disc is less deeply dished than said intermediate disc.

6. The rotary mower of claim 1 and further comprising a second bearing hub secured to the central portion of said intermediate disc and rotatably mounted on said first bearing hub, said first and second bearing hubs having radially spaced cylindrical portions defining a cavity therebetween, said axially shiftable bearing hub (9) including a cylindrical portion extending axially into said cavity.

7. The rotary mower of claim 1 and further comprising a second bearing hub coaxially secured to said intermediate disc and wherein said axially displaceable hub coaxially surrounds said second bearing hub.

8. The rotary mower of claim 1 wherein said drive shaft (12) is hollow and wherein said adjustment device includes an adjustment spindle (13) extending coaxially through said hollow drive shaft (12) and connected to said axially displaceable bearing hub, said adjustment spindle having an upper end extending beyond the upper end of said hollow drive shaft.

9. The rotary mower of claim 1 wherein said intermediate disc includes a second bearing hub rotatably mounted on said first bearing hub and presenting an axially extending threaded opening and wherein said adjustment device includes an adjustment spindle (25) coaxially beneath said drive shaft and connected to said axially displaceable bearing hub, said adjustment spindle including a threaded part extending upwardly in threaded engagement with said threaded opening.

10. The rotary mower of claim 1 and further comprising a second bearing hub secured coaxially to said intermediate disc, said hubs having coaxial cylindrical portions and wherein said cylindrical portion of said axially displaceable hub has a telescopic relationship with the cylindrical portion of said second bearing hub.

11. A rotary mower having a frame, at least one rotary cutter unit mounted on said frame for rotation about a generally vertical axis, drive means for rotating said cutter unit including an upright drive shaft, a cutter disc secured coaxially to the lower end of said drive shaft, a skid disc of flexible plastic material below said cutter disc, an intermediate disc of rigid material between said skid disc and said cutter disc and rotatably mounted on the latter, a bearing hub secured to the central portion of said skid disc, an adjustment device operable to adjust said bearing hub axially relative to said rotary cutter unit, a ground engaging reinforcing wear disc (21) with a substantially smaller outer diameter than said skid disc mounted on the central underside of said skid disc, said skid disc having an outer rim supported at the outer rim of said intermediate disc (5) whereby said outer rim of said skid disc does not shift axially during axial adjustment of said bearing hub relative to said rotary cutter unit.

12. The rotary mower of claim 11 wherein said outer rim of said skid disc is releasably secured to the outer rim of said intermediate disc.

13. The rotary mower of claim 11 wherein said drive shaft is hollow and wherein said adjustment device includes an adjustment spindle extending through said hollow shaft and having its lower end connected to said bearing hub.

* * * * *